(12) United States Patent
Iijima et al.

(10) Patent No.: US 6,267,874 B1
(45) Date of Patent: Jul. 31, 2001

(54) HYDROTREATING CATALYST AND PROCESSES FOR HYDROTREATING HYDROCARBON OIL WITH THE SAME

(75) Inventors: Masahiko Iijima; Yoshinobu Okayasu, both of Saitama (JP)

(73) Assignee: TonenGeneral Sekiyu K.K., Tokyo (JP)

( * ) Notice: Subject to any disclaimer, the term of this patent is extended or adjusted under 35 U.S.C. 154(b) by 0 days.

(21) Appl. No.: 09/341,759

(22) PCT Filed: Nov. 17, 1998

(86) PCT No.: PCT/JP98/05170
§ 371 Date: Sep. 27, 1999
§ 102(e) Date: Sep. 27, 1999

(87) PCT Pub. No.: WO99/25473
PCT Pub. Date: May 27, 1999

(30) Foreign Application Priority Data

| Nov. 18, 1997 | (JP) | 9-333531 |
| Jun. 16, 1998 | (JP) | 10-185656 |
| Jun. 19, 1998 | (JP) | 10-189732 |
| Jun. 19, 1998 | (JP) | 10-189738 |
| Jun. 19, 1998 | (JP) | 10-189742 |

(51) Int. Cl.$^7$ .......................... C10G 45/04; C10G 45/60; B01J 23/00
(52) U.S. Cl. .............. 208/217; 208/216 R; 208/216 PP; 208/251 H; 208/254 H; 208/264; 208/111.3; 208/111.35; 502/313; 502/238; 502/254; 502/257; 502/258; 502/259; 502/260; 502/261; 502/262; 502/235; 502/263; 502/314
(58) Field of Search .................... 208/216 R, 216 PP, 208/217, 251 H, 254 H, 264, 111.3, 111.35; 502/238, 254, 257, 258, 259, 260, 261, 262, 235, 263, 313, 314

(56) References Cited

U.S. PATENT DOCUMENTS 4,837,193 * 6/1989 Akizuki et al. .................... 502/242
5,944,983 * 8/1999 Hayashi et al. ..................... 208/264

FOREIGN PATENT DOCUMENTS

| 0 160 475 B1 | 11/1985 | (EP) . |
| 0 875 287 A2 | 11/1998 | (EP) . |
| 60-225645 | 11/1985 | (JP) . |
| 5-192587 | * 8/1993 | (JP) . |
| 6-296879 | * 10/1994 | (JP) . |
| 7-196308 | 8/1995 | (JP) . |
| 9-164334 | 6/1997 | (JP) . |
| 10-296091 | * 11/1998 | (JP) . |
| 7-196308 | * 11/1998 | (JP) . |
| 0 875 287 A2 | 4/1998 | (WO) . |

* cited by examiner

*Primary Examiner*—Walter D. Griffin
(74) *Attorney, Agent, or Firm*—Venable; Marina V. Schneller; Keith G. Haddaway

(57) ABSTRACT

The present invention relates to a hydrotreating catalyst composed of a carrier having a Brønsted acid content of at least 50 $\mu$mol/g such as a silica-alumina carrier or a silica-alumina-third component carrier, in which the silica is dispersed to high degree and a Brønsted acid content is at least 50 $\mu$mol/g, and at least one active component (A) selected from the elements of Group 8 of the Periodic Table and at least one active component (B) selected from the elements of Group 6 of the Periodic Table, supported on said carrier. The present invention also relates to a method for hydrotreating hydrocarbon oils using the same. The hydrotreating catalyst of the present invention provides excellent tolerance to the inhibiting effect of hydrogen sulfide, high desulfurization activity, and exhibits notable effects for deep desulfurization of hydrocarbon oils containing high contents of sulfur, in particular gas oil fractions containing difficult-to-remove sulfur compounds. The hydrotreating catalyst of the present invention is also very effective for hydrodenitrogenation, hydrocracking, hydrodearomatization, hydroisomerization, hydrofining and the like of hydrocarbon oils.

22 Claims, 1 Drawing Sheet

Content of sulfur derived from DMDS in sample oils, wt.%

B acid content, $\mu$ mol/g

HYDROTREATING CATALYST AND PROCESSES FOR HYDROTREATING HYDROCARBON OIL WITH THE SAME

FIELD OF INDUSTRIAL UTILIZATION

This invention relates to a hydrotreating catalyst and a method for hydrotreatment of hydrocarbon oils using the same, more particularly to the catalyst high in tolerance to inhibiting effects by hydrogen sulfide and nitrogen compounds and high in activity and activity-maintenance, and the method using the same for various hydrotreating purposes, e.g., hydro-desulfurization, hydrodenitrogenation, hydrocracking, hydrodearomatization, hydroisomerization and hydrofining.

BACKGROUND OF THE PRESENT INVENTION

Various types of catalysts have been proposed for hydrotreating hydrocarbon oils. The so-called two-element catalysts, with the Group 6 elements (e.g., molybdenum and tungsten) and Group 8 elements (e.g., cobalt and nickel) as the active metallic components carried by refractory inorganic oxides (e.g., alumina, silica and magnesia), have been already commercialized. These catalysts have been further developed to have higher desulfurization and/or denitrogenation activity, both from active metallic components and carriers. The applicant of the present invention have already studied to further improve catalyst activity by improving dispersibility of the active metallic components, to propose an extremely high-activity catalyst with high desulfurization activity, which is prepared by supporting cobalt and/or nickel as the Group 8 metals on a silica-alumina carrier in the first step, and further supporting molybdenum and/or tungsten as the Group 6 metals on the same carrier in the second step, to finely disperse molybdenum as the major component on the carrier (Japanese Laid-open Patent application No. 225645/1985).

The carriers have been also developed, by controlling pore size distributions of silica-alumina carriers, to improve desulfurization activity of the catalysts for hydrotreating by maximizing the pores having a diameter of 30 Å to 100 Å.

Recently, however, reduction of sulfur content of gas oils is strongly required for environmental reasons, especially for stocks of higher sulfur contents, e.g., light gas oil (LGO) and vacuum gas oil (VGO). In particular, sulfur content of LGO is strongly required to be reduced to 0.05 wt. % or lower for environmental reasons. Whether this is achieved or not largely depends on whether sulfur compounds difficult to remove, e.g., 4-methyl dibenzothiophene and 4,6-dimethyl dibenzothiophene, are efficiently desulfurized, in particular at a high hydrogen sulfide partial pressure.

It is however known that the two-element catalysts are rapidly deactivated, when deeply hydrotreating hydrocarbon oils of high sulfur content, as a result of increased hydrogen sulfide partial pressure in the reaction atmosphere. In particular, the Ni—Mo catalyst, although showing a high desulfurization activity at a low hydrogen sulfide partial pressure, is rapidly deactivated at a high hydrogen sulfide partial pressure, because of its insufficient tolerance to the inhibiting effects by hydrogen sulfide. On the other hand, the Co—Mo catalyst, although higher in tolerance to hydrogen sulfide to some extent, has a disadvantage of lower desulfurization activity. It is therefore necessary to develop a catalyst simultaneously showing a high desulfurization activity and tolerance to the inhibiting effects by hydrogen sulfide, in order to deeply desulfurize hydrocarbon oils.

A variety of techniques have been proposed to solve these problems, viewed from carrier types, carrier structures, active metal components and method for supporting active metals on the carriers. For example, Japanese Laid-open Patent application No. 164334/1997 discloses the hydrotreating catalyst to desulfurize the difficult-to remove sulfur compounds present in gas oil, where an inorganic oxide carrier supports 5 mass % to 20 mass % (as oxide, percentage being based on the catalyst) of molybdenum in the first stage, which is dried and calcined, and then with 5 mass % to 15 mass % (as oxide) of molybdenum and 1 mass % to 10 mass % (as oxide) of nickel in the second stage, which is dried and calcined at 150° C. to 350° C. This catalyst, however, is an insufficient one for the catalyst for deep desulfurization of hydrocarbon oils, because of its low tolerance to the inhibiting effects by hydrogen sulfide.

DISCLOSURE OF THE PRESENT INVENTION

It is an object of the present invention to provide a hydrotreating catalyst, developed to solve the above problems involved in the conventional catalysts, which shows high tolerance to the inhibiting effects by hydrogen sulfide formed massively in the reaction atmosphere during the hydrotreatment process of hydrocarbon oils of high sulfur content, high activity for hydrotreatment of the compounds containing difficult-to-remove sulfur compounds, and can be used also for, e.g., hydrodenitrogenation, hydrocracking, hydrodearomatization and hydrofining.

It is another object of the present invention to provide an alumina-based hydrotreating catalyst of high silica content, in which silica is finely dispersed.

It is still another object of the present invention to provide a hydrotreating catalyst in which the active metals are finely dispersed by virtue of high dispersibility of silica.

It is still another object of the present invention to provide a method of hydrodesulfurization capable of deeply desulfurizing hydrocarbon oils containing difficult-to-remove sulfur compounds. The inventors of the present invention have studied extensively to solve the problems involved in the conventional catalysts, to find that the Brønsted acid sites on the hydrotreating catalyst carrier interacts with the catalyst active metals to greatly improve the catalyst tolerance to the inhibiting effects by hydrogen sulfide, with the result that the difficult-to-remove sulfur compounds can be efficiently removed, reaching the present invention.

The present invention relates firstly to the hydrotreating catalyst comprising the carrier having a Brønsted acid content of 50 μmol/g or more, which supports at least one active component (A) selected from the elements of Group 8 of the Periodic Table, and at least one active component (B) selected from the elements of Group 6 of the Periodic Table.

The present invention relates secondly to the hydrotreating catalyst, comprising the carrier of silica-alumina or the carrier of silica-alumina a third component, which supports at least one active component (A) selected from the elements of Group 8 of the Periodic Table, and at least one active component (B) selected from the elements of Group 6 of Periodic Table, wherein, (i) silica content is 30 wt. % or more, based on the total weight of the carrier, and (ii) the spectral patterns of the carrier observed by the nuclear magnetic resonance analysis [$^{29}$Si-NMR (79.5 MHz)] are characterized by:

① the combined area of peaks at −80 ppm, −86 ppm and −92 ppm being at least 15% of the total area of all peaks, and ② the combined area of peaks at −80 ppm, −86 ppm, −92 ppm and −98 ppm being at least 50% of the total area of all peaks.

The present invention relates thirdly to the method for hydrotreating hydrocarbon oils with hydrogen under the hydrotreatment conditions in the presence of the first or second catalyst of the present invention.

PREFERRED EMBODIMENTS OF THE PRESENT INVENTION

Figure 1:
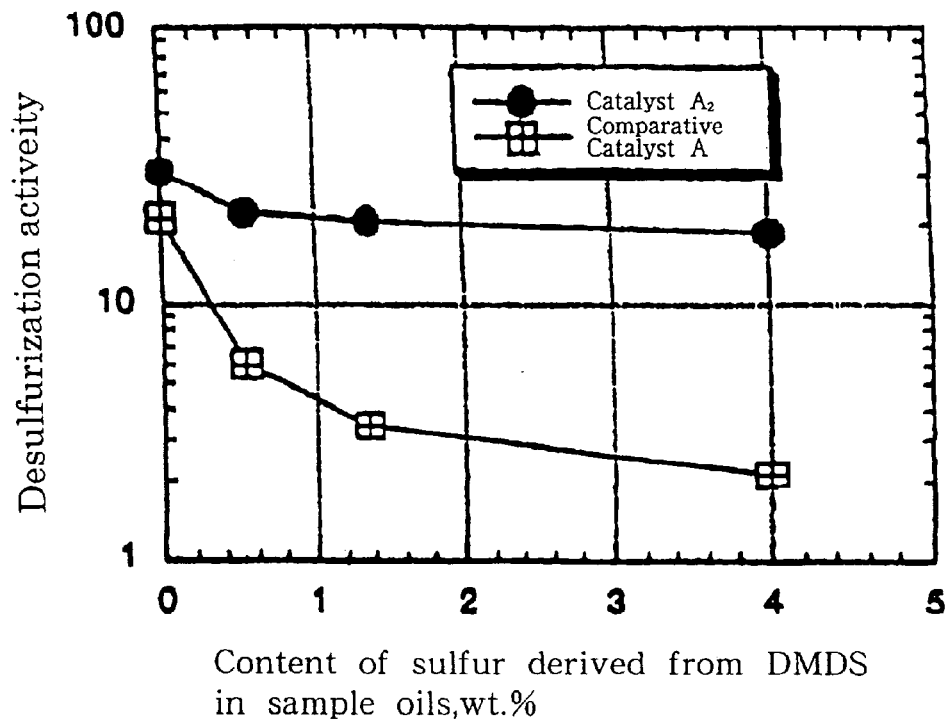
FIG. 1 illustrates the relationship between desulfurization activity and content of sulfur derived from dimethyl disulfide (DMDS) in the oil samples, for the hydrotreating catalyst $A_2$ of the present invention (EXAMPLE X) and comparative hydrotreating catalyst A (COMPARATIVE EXAMPLE X).

The hydrotreating catalyst of the present invention comprises the carrier having a Brønsted acid content of 50 $\mu$mol/g or more, which supports at least one active component (A) selected from the elements of Group 8 of the Periodic Table, and at least one active component (B) selected from the elements of Group 6 of the Periodic Table.

Carriers

The carrier materials useful for the present invention include alumina ($Al_2O_3$), silica ($SiO_2$), boric acid anhydride ($B_2O_3$), titania ($TiO_2$), zirconia ($ZrO_2$), iron(III)oxide ($Fe_2O_3$), beryllium oxide ((BeO), ceria ($CeO_2$), hafnia ($HfO_2$), magnesia (MgO), calcium oxide (CaO), zinc oxide (ZnO), thoria ($ThO_2$), chromium(III)oxide ($Cr_2O_3$), phosphorus oxides, and a combination thereof. The combinations include silica-alumina, silica-magnesia, silica-zirconia, silica-thoria, silica-beryllium oxide, silica-boria, silica-zinc oxide, alumina-zirconia, alumina-titania, alumina-boria, alumina-thoria, alumina-chromia, alumina-magnesia and titania-zirconia. Clay minerals, in particular crosslinked intercalation minerals, can be also used. These include zeolite, montmorillonite, kaoline, halloysite, bentonite, attapulgite, bauxite, kaolinite, nacrite and anorthite. They may be used alone or in combination. For example, a combination of alumina-zeolite can be used. Of the carriers listed above, particularly preferable ones are those based on silica-alumina and silica-alumina-a third component. The third component is selected from the group consisting of the above carrier materials except silica and alumina, e.g., an alkali metal, alkaline earth metal, boria, titania, zirconia, iron(III)oxide, beryllium oxide, ceria, hafnia, zinc oxide, thoria, chromium(III)oxide, phosphorus oxides, and zeolites and clay minerals. These silica-alumina-third component carriers include silica-alumina-boria, silica-alumina-titania, silica-alumina-zirconia, silica-alumina-hafnia, silica-alumina-ceria, silica-alumina-sodium oxide, silica-alumina-magnesia, silica-alumina-phosphorus oxides and silica-alumina-zeolite.

It is important that the carrier for the hydrotreating catalyst of the present invention contains a B acid content of 50 $\mu$mol/g or more, preferably 80 $\mu$mol/g or more. Tolerance to the inhibiting effects by hydrogen sulfide (hereinafter referred to as the "tolerance to the inhibiting effects by $H_2S$") will be insufficient when the B acid content is below 50 $\mu$mol/g, making the catalyst incapable of deeply hydrotreating hydrocarbon oils. Hydrocarbon oils will be cracked excessively, notably deactivating the catalyst, when it exceeds approximately 2000 $\mu$mol/g.

B acid, defined as a proton donor, and a specific site on a solid surface at which the acid donates a proton is referred to as a B acid site. The catalyst exchanges electrons with ambient reactants at this site to promote a variety of reactions. In this specification, B acid content of the carrier is defined as number of B acid sites per unit mass of the carrier ($\mu$mol/g).

It is possible to control B acid content of the carrier at 50 $\mu$mol/g or more by controlling rate of dropping each carrier component solution to the solvent during the carrier synthesis process, pH changes of the synthesized solution, and rate of dropping water for the hydrolysis, in order to control deposition rate of each component and improve dispersibility of each component in the carrier.

B acid content can be determined by various methods. It was determined by the following series of steps for the carrier for the hydrotreating catalyst of the present invention:

A) Put 0.05 g of the sample in a glass tube or the like, and evacuate the tube at 500° C. for 1 hour under a vacuum.
B) Pass 2,6-dimethyl pyridine (2,6-DMPy) into the evacuated glass tube kept at 200° C., to be adsorbed by the sample.
C) Pass nitrogen gas into the glass tube kept at 200° C. for approximately 1 hour, after the adsorption step is over, to confirm that no 2,6-DMPy is detected in the exhaust gas.
D) Heat the sample on which 2,6-DMPy is adsorbed at 5° C./min to 800° C., to desorb 2,6-DMPy, and determine quantity of 2,6-DMPy desorbed by an adequate method, e.g., gas chromatography, mass spectrometric analysis or conductometric titration. Here, B acid content ($\mu$mol/g) is defined as quantity of 2,6-DMPy desorbed from unit mass of the sample.

Specific surface area and pore volume of the carrier are not limited, but preferably 200 $m^2$/g or more, more preferably 400 $m^2$/g or more for the former, and 0.4 ml/g to 1.2 ml/g for the latter, in order to secure a specific B acid content and allow the catalyst to efficiently remove the difficult-to-remove sulfur compounds. For example, the carrier of mesoporous silica-alumina (having pores of intermediate size) is more preferable than that of silica-alumina (amorphous silica-alumia) having a smaller specific surface area, because of the former's higher B acid content and more finely dispersed active components to give a larger number of active sites.

The carriers of silica-alumina and silica-alumina-third component are described below as the preferable ones for the hydrotreating catalyst of the present invention:
(Silica-alumina Carrier)

It is possible to secure a sufficient B acid content for hydrodesulfurization, hydrodenitrogenation, hydrodearomatization or the like, when the silica-alumina carrier contains silica at 2 wt. % or more, based on the total weight of the carrier, and a B acid content of 50 $\mu$mol/g or more. The high silica-content carrier is preferable, e.g., that contains silica at 10 wt. % or more, more preferably 20 wt. % or more, still more preferably 30 wt. % or more, and still more preferably 40 wt. % or more, in order to increase B acid content and improve tolerance of the catalyst to the inhibiting effects by $H_2S$ for deep desulfurization of sulfur-containing hydrocarbon oils. The silica content below 2 wt. % or above 95 wt. % will cause difficulties in making a practically useful, high-activity catalyst: essentially no B acid sites express themselves at a silica content below 2 wt. %, and hydrocarbons will be excessively cracked at above 95 wt. %, to decrease yield of the desired product.

The silica-alumina carrier having a specific B acid content for the hydrotreating catalyst of the present invention is obtained by finely dispersing silica in the carrier. It is therefore preferable for such a catalyst to have many aluminium atoms bonded to the silicon atoms regularly. It is also preferable that dispersibility of silica is specified by coordination molphology between the silicon and aluminium atoms via the oxygen atoms, determined by the nuclear magnetic resonance analysis. More concretely, the spectral peaks of silica-alumina obtained by the $^{29}$Si-NMR (79.5 MHz) method are processed for waveform deconvolution by the least square adjustment method using the Gaussian function curve into those at −80 ppm, −86 ppm, −92 ppm, −98 ppm, −104 ppm and −110 ppm, silica dispersibility being set for each peak and represented by peak area ratio. The above peak position is set based on bonding characteristic of silica, used as the waveform deconvolution condition for the $^{29}$Si-NMR method, described later in EXAMPLES.

As a result, the coordination types between the silicon and aluminium atoms are morphologically represented by the following formulae (I) through (V):

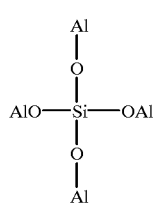

(I)

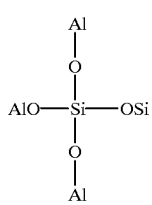

(II)

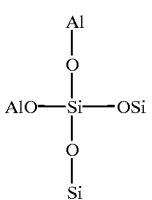

(III)

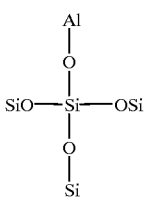

(IV)

-continued

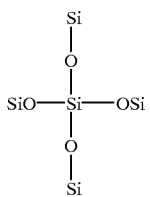

(V)

The silica-alumina carrier for the hydrotreating catalyst of the present invention has:
(i) a peak at −80 ppm, considered to represent the structure shown by formula (I) with the silicon atom bonded to 4 aluminium atoms (Si-4(OAl)), a peak at −86 ppm, considered to represent the structure shown by formula (II) with the silicon atom bonded to 3 aluminium atoms (Si-3(OAl)), and a peak at −92 ppm, considered to represent the structure shown by formula (III) with the silicon atom bonded to 2 aluminium atoms (Si-2(OAl)), having a combined area of at least 15% of the total area of all peaks (this ratio is hereinafter referred to as the "NMR area ratio I"), and
(ii) the peaks described in the above (i) and a peak at −98 ppm, considered to represent the structure shown by formula (IV) with the silicon atom bonded to one aluminium atom (Si-1(OAl)), having a combined area of at least 50% of the total area of all peaks (this ratio is hereinafter referred to as the "NMR area ratio II").

It is necessary for the carrier to simultaneously satisfy the above conditions (i.e., NMR area ratio I of at least 15% and NMR area ratio II of at least 50%), in order to realize the effects of the present invention: the good acidic conditions will not be formed unless the above conditions are satisfied simultaneously, leading to decline of the activity for hydrodesulfurization, hydrodenitrogenation, hydrodearomatization or the like.

The silica-alumina carrier having the finely dispersed silica component and a high B acid content can be obtained by one of the methods (1) through (5), described below:
(1) Silicon alkoxide and aluminium alkoxide are mixed with a solution containing at least one type of oxygenated, polar compound (e.g., dihydric alcohol, aminoalcohol, ketoalcohol, diketone, ketocarboxylic acid, oxycarboxylic acid and dicarboxylic acid) at 10° C. to 200° C., preferably 20° C. to 80° C., to form a homogeneous solution, to which water is added at the same temperature for hydrolysis, to totally gel the homogeneous sol. The gel is then dried at 30° C. to 200° C., and calcined at 200° C. to 1000° C., to remove the residual polar compound(s) from the gel, in order to form the silica-alumina composition. The thermal treatment may be effected only with steam, or optionally in an oxygen or air atmosphere.

Each of the above silicon alkoxide and aluminium alkoxide has preferably an alkoxyl group having a carbon number of 1 to 10, preferably 1 to 5. More concretely, the silicon alkoxides useful for the present invention include tetramethoxysilane (Si(OCH$_3$)$_4$), tetraethoxysilane (Si(OC$_2$H$_5$)$_4$), tetraisopropoxysilane ((Si(i-OC$_3$H$_7$)$_4$) and tetra-tertiary-butoxysilane (Si(t-OC$_4$H$_9$)$_4$), and the aluminium alkoxides include aluminium trimethoxide (Al(OCH$_3$)$_3$), aluminium triethoxide (Al(OC$_2$H$_5$)$_3$), aluminium triisopropoxide (Al (i-OC$_3$H$_7$)$_3$) and aluminium tributoxide (Al(OC$_4$H$_9$)$_3$). Concentration of each of these compounds can be optionally set, but the silicon alkoxide/aluminium alkoxide ratio is set to give a desired silicon content (e.g., 30 wt % and more) in the silica-alumina carrier. The polar compound is used in a molar ratio of 0.1 to 20, preferably 0.1 to 15, to the silicon alkoxide and aluminium alkoxide. Water for hydrolysis in the gelation process is used in a molar ratio of 0.5 to 50, preferably 1 to 40, to the silicon alkoxide and aluminium alkoxide. The hydrolysis process may be accelerated by a water-soluble hydrolysis accelerator, e.g., inorganic acid, organic acid, inorganic alkali and organic alkali, in particular organic acid, e.g., formic acid or oxalic acid; and organic alkali, e.g., amine or aminoalcohol.

(2) This method uses metallic alkoxides, like the method (1) above, but no oxygenated, polar compound. This method falls into the following 3 sub-groups ① to ③:

① A mixture of an aluminium alkoxide and water is heated, to form a white, turbid sol. A mineral acid, e.g., nitric acid or hydrochloric acid, is added and the solution thus prepared is kept acidic, preferably at pH of 2 to 3, to form the clear sol. Then, a silicon alkoxide or another type of silicon compound (e.g., silicon halide) is added to the clear sol for gelation to form the silica-alumina gel, where quantity of the silicon compound added is adjusted to give a desired silicon content (e.g.,30 wt. % or more) in the silica-alumina carrier. The gel is dried and calcined into the silica-alumina composition for the carrier. The drying and calcination methods will be similar to those for the above method (1).

② This method is similar to the above method ①, except that the silicon compound and aluminium compound are added in this order. Water is added to a silicon alkoxide to form a clear sol, to which an aluminium compound (e.g., aluminium alkoxide, aluminium sulfate, aluminium nitrate or aluminium hydroxide) is added, to turn the sol into gel. It is dried and calcined in a manner similar to those for the above method, to form the silica-alumina composition.

③ This method uses a composite alkoxide, where an aluminium alkoxide is mixed with cyclohexane, to which trimethylsilyl acetate $(CH_3COOSi(CH_3)_3)$ mixed with cyclohexane is dropped under heating with reflux, to form the composite silicon-aluminium alkoxide. The composite alkoxide is hydrolyzed into the gel, which is dried and calcined by the common methods into the silica-alumina composition for the carrier.

(3) The silica-alumina carrier for the hydrotreating catalyst of the present invention can be also prepared by the so-called coprecipitation. This method uses No.3 water glass as specified by the Japanese Industrial Standards (JIS) (hereinafter referred to as the "No.3 water glass") as the silica source, and sodium aluminate as the alumina source. They are homogeneously mixed with each other at a pH of around 8, to which an aqueous solution of mineral acid (e.g., nitric acid) is added dropwise, to coprecipitate them. The coprecipitation can be also effected by adding aqueous solution of water glass, aqueous solution of sodium aluminate and nitric acid simultaneously to water. Quantity of the silica source is set to give a desired silica content in the carrier.

A silicate of alkali metal as the silica source can be used as the aqueous solution containing the water-soluble salt at 0.1 mols to 10 mols, preferably 0.3 mols to 5 mols, and sodium aluminate as the alumina source can be used as the aqueous solution containing the water-soluble salt at 0.1 mols to 4 mols, preferably 0.3 mols to 2 mols.

(4) The silica-alumina carrier for the hydrotreating catalyst of the present invention can be also prepared by deposition of silica hydrate gel over alumina hydrate gel. The alumina source useful for the present invention includes a water-soluble, acidic or alkaline aluminium compound, e.g., sulfate, chloride or nitrate of aluminium; sodium aluminate; or aluminium alkoxide. The silica source is a water-soluble silicon compound, e.g., silicate of alkali metal (e.g., No.3 water glass, having an $Na_2O/SiO_2$ ratio of 1:2 to 1:4), tetraalkoxysilane, or orthosilicate ester. These aluminium and silicon compounds are used in the form of aqueous solutions. Their concentrations can be optionally set, but concentration of the aluminium compound is set at 0.1 mols to 4 mols, and that of the silicon compound is set to give a desired silica content in the carrier.

An example of deposition of the silica-alumina composition is described below:

Pure water is heated at around 40° C. to 90° C., in which sodium aluminate is dissolved, and the solution is kept at the same temperature and a pH level of 10 to 12. Then, nitric acid is added to the above solution to adjust its pH level at 8.5 to 9.5, and the solution is aged at the same temperature for 1.5 to 3 hours, to precipitate the alumina hydrate.

Next, an aqueous solution of sodium silicate (e.g., No.3 water glass) is added little by little to the above alumina hydrate, to which nitric acid is added to adjust the solution at a pH level of 8 to 10, and the solution is aged at around 50° C. to 90° C. for 1 hour to 3 hours, to deposit the silica hydrate over the alumina hydrate. Quantity of sodium silicate to be used is set to give a desired silica content (30 wt. % or more) in the silica-alumina carrier. The precipitates are separated from the aqueous solution by filtration, washed with a solution of ammonium carbonate and water, and dried and calcined to form the silica-alumina composition for the carrier. The drying is effected at normal temperature to around 200° C. in the presence or absence of oxygen, and the calcination is effected at around 200° C. to 800° C. in the presence of oxygen.

(5) The silica-alumina carrier with finely dispersed silica for the hydrotreating catalyst of the present invention can be also prepared by vapor-phase deposition, in which silicon alkoxide is deposited over an alumina carrier produced by the conventional method. It can be also produced by depositing aluminium oxide over a silica carrier by the vapor-phase deposition method.

(Silica-alumina-third Component Carrier)

Next, the silica-alumina-third component carrier is described.

The silica-alumina-third component carrier for the hydrotreating catalyst of the present invention comprises silica, alumina and a third component. It must have an NMR area ratio I of at least 15% and NMR ratio II of at least 50%, as is the case of the silica-alumina carrier above. The silica content is 2 wt. % or more, preferably 10 wt. % or more, more preferably 20 wt. % or more, based on the total weight of the carrier composition. The third components useful for the present invention include an alkali metal, an alkaline earth metal, boria, titania, zirconia, iron(III)oxide, ceria, hafnia, thoria, beryllium oxide, zinc oxide, chromium(III) oxide, phosphorus oxides, zeolites and clay minerals. These silica-alumina-third component carriers fall into the following three general categories by type of the third component.

The third component A has an alkali metal or alkaline earth metal (hereinafter referred to as the "alkali metal component or the like," as required), the third component B includes boria, titania, zirconia, iron(III)oxide, ceria, hafnia, thoria, zinc oxide, chromium(III)oxide, zeolites and clay mineral (hereinafter referred to as the "boria or the like," as required), and the third component C has phosphorus oxides.

(1) Silica-alumina-third Component A Carrier

The silica-alumina-third component A carrier comprises silica, alumina and the alkali metal component or the like, and has a Brønsted acid content of 50 μmol/g or more. The alkali metal component or the like is at least one type of component selected from the group consisting of alkali metal and alkaline earth metal components. More concretely, the alkali metals include sodium, potassium and lithium, and the alkaline earth metals include calcium, magnesium, strontium and barium, normally used in the form of oxides.

The silica-alumina-third component A carrier is characterized by diminished or removed strong B acid content in the B acid distribution by including the alkali metal component or the like. More concretely, the B acid content in a range from 600° C. to 800° C. in the 2,6-DMPy-TPD profile accounts for 10% or less, preferably 7% or less, of the total B acid content. The carrier having the above B acid distribution provides the hydrotreating catalyst with favorable effects, such as excellent tolerance to the inhibiting effects by $H_2S$, notably controlled coking of hydrocarbons, and excellent activity maintenance.

Content of the alkali metal component or the like is 0.01 wt. % to 10 wt. %, preferably 0.05 wt. % to 8 wt. % as the oxide, based on the total weight of the carrier composition. The effects on the B acid distribution is insufficient at below 0.01 wt. %, and the effects of removing strong B acid sites are not expected much, accelerating coking of hydrocarbons and declining catalyst activity. At above 10 wt. %, on the other hand, the effects of B acid no longer increase with its content.

Methods for adding a third component to the hydrotreating catalyst of the present invention using the silica-alumina-third component A carrier are not limited, and it can be added by a common method. Some of these methods are described below:

① A silica-alumina carrier is impregnated first with the alkali metal component or the like, using its solution, and then with the active components.

② A silica-alumina carrier is impregnated first with the active components and then with the alkali metal component or the like, using its solution.

③ A silica-alumina carrier is impregnated simultaneously with the alkali metal component or the like and active components, using a mixed solution of these components.

④ The alkali metal component or the like is added to the carrier stocks during the carrier production stage, i.e., when the silica-alumina carrier is produced using their alkoxide solutions, a given quantity of sodium methoxide, calcium methoxide or barium ethoxide is added to the alkoxide solutions.

(2) Silica-alumina-third Component Carrier B

The silica-alumina-third component B carrier comprises silica, alumina and the third component B below described, and has a Brønsted acid content of 50 μmol/g or more.

The third component B is optionally selected from the group consisting of boria, titania, zirconia, iron(III) oxide, ceria, halfnia, thoria, beryllium oxide, zinc oxide, chromium (III) oxide, and zeolite and clay minerals (referred to as the "metallic component of boria or the like", as required).

The third component B works to increase total B acid content, more notably B acids of medium to weak in strength. More concretely, the strong B acid in a range from 600° C. to 800° C. in the 2,6-DMPy-TPD profile shows little increase, whereas weak to medium B acids in a range from 200° C. to 400° C. and from 600° C. to 800° C. show notable increases. Therefore, the third component B can provide a sufficient B acid content for desulfurization reactions in the presence of hydrogen sulfide, while controlling coking of the hydrocarbons.

Content of the metallic component of boria or the like is 0.01 wt. % to 50 wt. %, preferably 0.05 wt. % to 40 wt. %, more preferably 0.1 wt. % to 30 wt. % as the oxide, based on the total weight of the carrier composition. The effects on the B acid distribution is insufficient at below 0.01 wt. %, and the effects of B acid no longer increase with its content at above 50 wt. %.

Methods for producing the silica-alumina-third component B carrier are not limited, and it can be produced by a common method. For example, the metallic component of boria or the like may be added to the carrier stocks during the carrier production stage, or added to the produced carrier from the liquid or vapor phase. In the liquid-phase process, the carrier may be impregnated with boria or the like by dropping onto the silica-alumina carrier (Pore-Filling method). Some of the methods for producing the carrier with finely dispersed silica by adding boria or the like to the carrier stocks during the carrier production stage are described below:

<1> A solution of alkoxide or another compound as the third component B is added to silicon alkoxide and aluminium alkoxide during the carrier production stage. Examples of the alkoxide as the third component B include boron methoxide, boron triethoxide, titanium tetraethoxide, titanium tetraisopropoxide, zirconium tetraethoxide, zirconium tetra-n-propoxide, zirconium tetra-sec-butoxide and hafnium tetraethoxide, which can be optionally used. The composition of silicon alkoxide, aluminium alkoxide and other metal alkoxide is prepared in such a way to give desired contents of silica and the third component B in the whole carrier composition. Quantities of an oxygenated, polar compound and water for hydrolysis in the gelation process are also determined to satisfy the above objectives.

<2> The method falling into this category uses the metal alkoxides, but no oxygenated, polar compound. It is further subdivided into the methods ① to ③ for the silica-alumina carrier described earlier. In each case, the carrier can be prepared by the method similar to that for the silica-alumina carrier described earlier by adding an alkoxide of, e.g., boron, titanium, zirconium or hafnium, or a water-soluble compound thereof, to silicon or aluminium alkoxide.

<3> The silica-alumina-third component B carrier for the present invention can be also prepared by coprecipitation. The carrier can be prepared by the method similar to that for the silica-alumina carrier described earlier by adding a given quantity of the above metallic component in the form of a water-soluble compound, e.g., triethyl borate. Quantities of the silica source and the metallic component of boria or the like are set to give desired silica and the metallic component contents in the silica-alumina-third component B carrier. It is preferable to use the water-soluble salt of the metallic component source in a range from 0.01 mols to 2 mols, for gel precipitation with silica and alumina.

<4> The silica-alumina-third component B carrier can be also prepared by deposition, where the hydrate gels of silica and metallic component are deposited over the alumina hydrate gel. It can be prepared by the method similar to that for the silica-alumina carrier described earlier by adding the above metallic component in the form of a water-soluble compound, e.g., triethyl borate.
(3) Silica-alumina-third Component Carrier C The silica-alumina-third component C carrier comprises silica, alumina and the third component C below described, and has a Brønsted acid content of 50 µmol/g or more.

The third component C is a phosphorus compound, such as phosphoric acid, phosphorous acid, hydrophosphorous acid, phosphomolybdic acid, phosphotungstic acid or ammonium phosphotungstate, normally added to the silica-alumina composition in the form of an oxide. Content of the phosphorus compound is 0.01 wt. % to 10 wt. % as the oxide, based on the total weight of the carrier, preferably 0.05 wt. % to 8 wt. %. The hydrotreating catalyst on the silica-alumina-phosphorus component carrier shows improved tolerance to the inhibiting effects by nitrogen compounds, and hence improved desulfurization activity. It is considered, although not fully substantiated, that addition of the phosphorus compound changes the active site structure. Virtually no improvement of the tolerance to the inhibiting effects by nitrogen compounds nor improvement of the desulfurization acitivity is observed at a phosphorus compound content below 0.01 wt. %, and the effects of the phosphorus compound no longer increase with its content at above 10 wt. %.

Methods for producing the silica-alumina-phosphorus component carrier are not limited. For example,:

① The silica-alumina carrier is impregnated first with a phophoric acid solution alone and then with the active components.

② The silica-alumina carrier is impregnated first with the active components and then with a phophoric acid solution.

③ The silica-alumina carrier is impregnated with a mixed solution of the phosphorus component and active components.

④ The silica-alumina carrier is impregnated with a heteropoly acid of the active components and phosphorus component (e.g., phosphomolybdic acid).

⑤ The phosphorus compound is added to the carrier stocks during the carrier production stage, i.e, when the silica-alumina carrier is produced using their alkoxide solutions, an alkoxide of the phosphorus compound (e.g., trimethyl phosphate) is used.

The silica-alumina-third component C carrier thus prepared must have a B acid content of 50 µmol/g or more, preferably 80 µmol or more. The hydrotreating catalyst on the above carrier must have the specific NMR area ratios described earlier.

Hydrotreating Catalyst

The active component (A) for the hydrotreating catalyst of the present invention is at least one active component selected from the elements of Group 8, such as iron (Fe), cobalt (Co), nickel (Ni), ruthenium (Ru), rhodium (Rh), palladium (Pd), osmium (Os), iridium (Ir) and platinum (Pt), preferably cobalt, nickel, ruthenium, rhodium, palladium, iridium and platinum. They may be used alone or in combination.

Content of the active component (A) is 0.05 wt. % to 20 wt. % as the oxide(s), based on the total weight of the catalyst composition, preferably 0.1 wt. % to 15 wt. %. At below 0.05 wt. %, quantity of the active component is insufficient for the interactions with B acid, causing various problems, such as insufficient tolerance to the inhibiting effects by H$_2$S and accompanied difficulty in deep desulfurization of sulfur-containing hydrocarbon oils, and insufficient catalyst activity for hydrodenitrogenation, hydrocracking, hydrodearomatization, hydrofining or the like. At above 20 wt. %, on the other hand, the active component cannot be finely dispersed on the carrier, decreasing number of the active sites, which, in turn, declines the catalyst activity for hydrotreatment, e.g., hydrodesulfurization and hydrodenitrogenation.

The active component (B) for the hydrotreating catalyst of the present invention is at least one active component selected from the elements of Group 6, such as chromium (Cr), molybdenum (Mo), and tungsten (W), preferably molybdenum and tungsten. They may be used alone or in combination.

Content of the active component (B) is 5 wt. % to 40 wt. % as the oxide(s), based on the total weight of the catalyst composition, preferably 8 wt. % to 30 wt. %. At below 5 wt. %, number of the active sites is insufficient to give the high activity for hydrotreatment, e.g., hydrodesulfurization and hydrodenitrogenation. At above 40 wt. %, on the other hand, the active component cannot be finely dispersed on the carrier, decreasing number of the active sites, which, in turn, makes it difficult to deeply desulfurize sulfur-containing hydrocarbon oils and declines the catalyst activity for hydrotreatment, e.g., hydrodenitrogenation.

The concrete combinations of the active components (A) and (B) for hydrotreatment, e.g., hydrodesulfurization and hydrodenitrogenation, of sulfur-containing hydrocarbon oils include cobalt-molybdenum, nickel-molybdenum, nickel-tungsten, cobalt-nickel-molybdenum and cobalt-nickel tungsten.

Each of the above active components can be incorporated with a Group 7 element (e.g., manganese), Group 12 element (e.g., zinc) and Group 14 element (e.g., tin and germanium).

Methods for producing the hydrotreating catalyst of the present invention are not limited, and a known method can be used. For example, nitrates, acetates, formates, ammonium salts, phosphates and oxides of a Group 8 element as the active component (A) and Group 6 element as the active component (B) are dissolved in a solvent to prepare the solution for impregnation. This solution is then incorporated with an organic acid, e.g., citric, tartaric, malic, acetic or oxalic acid, and adjusted at a pH level of around 9 with ammonia water. The resultant solution having a pH level of around 9, is added, with stirring, to the carrier drop by drop for the impregnation.

The solvents are not limited, and various ones can be used. These include water, ammonia water, alcohols, ethers, ketones and aromatic compounds, preferably water, ammonia water, acetone, methanol, n-propanol, i-propanol, n-butanol, i-butanol, hexanol, benzene, toluene, xylene, diethyl ether, tetrahydrofuran and dioxane, more preferably water.

The mixing ratio of the solvent and the both active components in the solution for impregnation and quantity of impregnation into the carrier are not limited, and can be set to give desired contents of the active components in the calcined catalyst, in consideration of easiness of the impregnation and drying and calcination processes.

The carrier impregnated with the active components is then formed into a desired shape by tablet making, extrusion, rotational granulation or the like, dried by wind and/or hot wind, heating or freeze-drying, and calcined at 400° C. to 600° C. for 3 hours to 5 hours. The oxides of the active components supported by the carrier will agglomerate as the crystals at an excessively high calcination temperature, decreasing surface area and pore volume, and hence catalyst activity. On the other hand, ammonia, acetate ions or the like contained in the supported active components may not be sufficiently removed at an excessively low calcination temperature, with the result that the active sites on the catalyst surface may not be sufficiently exposed, also possibly causing activity decline. It is preferable to effect the calcination process gradually.

The active components for the hydrotreating catalyst of the present invention may be added to the carrier separately in two steps. For example, the component (B) and (A) are added in this order, or this order may be reversed. It is preferable to add the component (A) to the carrier after the latter is immersed in ammonia water in the first step, and then the component (B) is added in the second step, viewed from securing high desulfurization activity.

The hydrotreating catalyst of the present invention preferably has a specific surface area of around 200 m$^2$/g or more, and total pore volume of 0.4 ml/g or more. It is cylindrical, granular, tablet or in any shape, preferably 0.5 mm to 3 mm in size.

The hydrotreating catalyst of the present invention may be used after it is mixed with another type of hydrotreating catalyst, as required. Ratio of the hydrotreating catalyst of the present invention is 5 wt. % to 50 wt. % based on the total mixture, preferably 10 wt. % to 40 wt. %. At below 5 wt. %, insufficient number of the spill-over hydrogen forming sites may result, which may possibly cause insufficient tolerance of the mixed catalyst to the inhibiting effects by H$_2$S, making it difficult to deeply hydrodesulfurize sulfur-containing hydrocarbon oils and decreasing the catalyst activity for other types of hydrotreatment. At above 50 wt. %, insufficient number of the active desulfurization sites may result, possibly making it difficult to deeply hydrodesulfurize sulfur-containing hydrocarbon oils and decreasing the catalyst activity for other types of hydrotreatment. As the another type of hydrotreating catalyst here, a known hydrotreating catalyst may be used.

Method of Hydrotreatment

Next, the method for hydrotreating hydrocarbon oils in the presence of the hydrotreating catalyst of the present invention is described.

The method of hydrotreatment of the present invention includes all of the reactions, e.g., hydrodesulfurization, hydrodenitrogenation, hydrocracking, hydrodearomatization, hydroisomerization and hydrofining, occurring when hydrocarbon oils are brought into contact with hydrogen in the presence of the hydrotreating catalyst of the present invention under hydrotreatment conditions. The hydrotreatment conditions can be optionally selected for the desired reactions.

The hydrocarbon oils which can be treated by the method of the present invention are not limited, and can be optionally selected from petroleum fractions, e.g., atmospheric and vacuum distillates, and cracked fractions, in particular atmospheric and vacuum gas oils, and gas oils from cracking processes, e.g., catalytic cracking, thermal cracking and coking. Vacuum gas oil contains a fraction boiling at about 370° C. to 610° C., obtained by distilling atmospheric residua under a vacuum and known to contain significant contents of sulfur, nitrogen and metals. For example, vacuum gas oil from a Middle Eastern crude contains sulfur and nitrogen at about 2 wt. % to 4 wt. % and 0.05 wt. % to 0.2 wt. %, respectively. Coker gas oil contains a fraction obtained by coking of residua and has a boiling point of about 200° C. or higher.

The reaction conditions under which sulfur-containing hydrocarbon oils are hydrodesulfurized optionally selected for specific conditions, e.g., feedstock type, and desired desulfurization and denitrogenation levels. They are generally in the following ranges; reaction temperature: 200° C. to 500° C., reaction pressure: 5 kg/cm$^2$ to 200 kg/cm$^2$, hydrogen/feedstock ratio: 50 l/l to 4000 l/l, and liquid hourly space velocity (LHSV): 0.05 h$^{-1}$ to 10h$^{-1}$. Content of hydrogen in hydrogen-containing gas may be 60% to 100%. More concretely, deep hydrodesulfurization of sulfur-containing hydrocarbon oils does not need particularly severe reaction conditions but proceeds under normal hydrodesulfurization conditions, e.g., reaction temperature: 200° C. to 500° C., preferably 250°C. to 400° C., reaction pressure: 5 kg/cm$^2$ to 60 kg/cm$^2$, liquid hourly space velocity: 0.05 h$^{-1}$ to 5 h$^{-1}$ and hydrogen/feedstock ratio: 50 l/l to 100 l/l Difficult-to-remove sulfur compounds, e.g., 4-methyl dibenzothiophene and 4,6-dimethyl dibenzothiophene, can be easily removed under the above reaction conditions, even in the presence of hydrogen sulfide.

The hydrotreating catalyst of the present invention can be used for any hydrodesulfurization reactor type, e.g., fixed, fluidized or moving bed reactor. However, a fixed bed reactor is particularly preferable from equipment and operation considerations. The hydrodesulfurization using the hydrotreating catalyst of the present invention can be effected by two or more reactors connected to one another. It is preferable to presulfide the active components of the hydrotreating catalyst of the present invention, before a hydrocarbon oil is passed over the catalyst under the hydrotreatment conditions.

The present invention is more concretely described by the following embodiments, which by no means limit the present invention.

(1) A hydrotreating catalyst comprising a silica-alumina carrier having a silica content of 10 wt. % or more and a B acid content of 50 μmol/g or more, which (A) supports at least one active component (A) selected from the elements of Group 8, and at least one active component (B) selected from the elements of Group 6 (hereinafter referred to as the "active component").

(2) A hydrotreating catalyst comprising a carrier composed of silica, alumina and a third component of an alkali metal and/or alkaline earth metal, and having a B acid content of 50 μmol/g or more, which supports the above active components (A) and (B),
wherein, the content of silica is 10 wt. % or more, based on the total weight of the carrier, and the content of the alkali metal and/or alkaline earth metal components is 0.01 wt. % to 10 wt. % as the oxide, also based on the total weight of the carrier.

(3) A hydrotreating catalyst of (2), wherein the B acid content in a range from 600° C. to 800° C. in the 2,6-DMPy-TPD profile accounts for 10% or less of the total B acid content.

(4) A hydrotreating catalyst comprising a carrier composed of silica, alumina and a metal component of boria or the like, and having a B acid content of 50 μmol/g or more, which supports the above active components (A) and (B),
wherein, content of silica is 10 wt. % or more, based on the total weight of the carrier, and
content of the metal component of boria or the like is 0.01 wt. % to 50 wt. % as the oxide, also based on the total weight of the carrier.

(5) A hydrotreating catalyst comprising a carrier composed of silica, alumina and a phosphorus component, and having a B acid content of 50 μmol/g or more, which supports the above active components (A) and (B),
wherein, the content of silica is 10 wt. % or more, based on the total weight of the carrier, and the content of the phosphorus component is 0.01 wt. % to 10 wt. % as the oxide, also based on the total weight of the carrier.

(6) The silica-alumina or silica-alumina-third component carrier, having a B acid content of 50 μmol/g or more, for the above hydrotreating catalyst.

(7) Method for hydrotreatment of sulfur-containing hydrocarbon oils using the catalyst or carrier, described in (1) through (6).

EFFECTS OF THE PRESENT INVENTION

In accordance with teaching of the present invention, described above in detail and concretely, the hydrotreating catalyst of the present invention exhibits improved tolerance to the inhibiting effects by $H_2S$ and high desulfurization activity by supporting at least one active component (A) selected from the elements of Group 8, and (B) at least one active component (B) selected from the elements of Group 6 on the carrier having a Brønsted acid content of 50 μmol/g or more, in particular the silica-alumina or silica-alumina-third component carrier finely dispersing silica and having Brønsted acid content of 50 μmol/g or more. Use of the hydrotreating catalyst of the present invention allows deep desulfurization, e.g., decreasing sulfur content to 0.05 wt. % or less, of sulfur-containing hydrocarbon oils, in particular those containing a high content of sulfur, e.g., light gas oil (LGO) and vacuum gas oil (VGO). The hydrotreating catalyst of the present invention is also useful for hydrodenitrogenation, hydrocracking, hydrodearomatization, hydrofining or the like.

PREFERRED EMBODIMENTS

The present invention is described more concretely by the following EXAMPLES and COMPARATIVE EXAMPLES, which by no means limit the present invention:

The sample oils used in EXAMPLES and COMPARATIVE EXAMPLES are described below:

Sample Oils

A total of 7 types of sample oils, shown in Table 1, were prepared using n-hexadecane (n-$C_{16}$), treated light gas oil (LGO-T), 4,6-dimethyl dibenzothiphene (4,6-DMDBT), dimethyl disulfide (DMDS) and quinoline. LGO-T contains 0.29 wt. % of sulfur, mostly derived from 4,6-DMDBT.

4,6-DMDBT is a model of difficult-to-remove sulfur compound present in hydrocarbon oils, and DMDS is a model of compound which generates hydrogen sulfide.

TABLE 1

| | Sample Oils | | | | | | |
|---|---|---|---|---|---|---|---|
| | 1 | 2 | 3 | 4 | 5 | 6 | 7 |
| Composition (wt. %) | | | | | | | |
| n-$C_{16}$ | 99.70 | 98.92 | 97.72 | 93.82 | 93.75 | — | 99.63 |
| LGO-T | — | — | — | — | — | 98.47 | — |
| 4,6-DMDBT | 0.30 | 0.30 | 0.30 | 0.30 | 0.30 | — | 0.30 |
| DMDS | — | 0.78 | 1.98 | 5.88 | 5.88 | 1.47 | — |
| Quinoline | — | — | — | — | 0.07 | 0.06 | 0.07 |
| Sulfur content (wt. %) | 0.05 | 0.58 | 1.40 | 4.05 | 4.05 | 1.05 | 0.05 |
| DMDS-derived sulfur content (wt. %) | 0 | 0.53 | 1.35 | 4.00 | 4.00 | 1.00 | 0 | n-$C_{16}$: n-hexadecane
LGO-T: treated light gas oil (sulfur content: 0.29 wt. %)
4,6-DMDBT: 4,6-dimethyl dibenzothiophene
DMDS: dimethyl disulfide

EXAMPLE X

Catalysts $A_1$, $A_2$ and $A_3$ 80.13 g of aluminium triisopropoxide [Al(i-$OC_3H_7$)3] (produced by Soekawa Rika) was mixed and reacted with 788 ml of 2-methylpentane-2,4-diol [$CH_3CH(OH)CH_2C(CH_3)_2OH$] (produced by Tokyo Kasei Kogyo), with stirring, at 80° C. for 5 h, to which 69.3 g of tetraethoxysilane [Si($OC_2H_5$)$_4$] (Koso Kagaku Yakuhin) was added to be further reacted with the above at 80° C. for 12 h, with stirring. Then, 225.8 ml of water was dropped to the above effluent at 1 ml/min, for hydrolysis at 80° C. On completing the hydrolysis, the product was dried at 90° C., and calcined at 600° C. for 5 h in a flow of air, to prepare the silica-alumina composition. It contained silica at 50 wt. %.

Next, 5.50 g of nickel nitrate [Ni($NO_3$)$_2$.6$H_2O$] (produced by Koso Kagaku Yakuhin), 6.93 g of ammonium molybdate [($NH_4$)$_6$$Mo_7O_{24}$.4$H_2O$] (produced by Koso Kagaku Yakuhin), and 3.1 g of citric acid were dissolved in 40.5 g of a mixed solution of concentrated ammonia water and pure water, to prepare the solution for impregnation. Composition of the mixed solution of concentrated ammonia water and water was set to adjust the solution for impregnation at pH=9, after it dissolved all of the above solutes. The above silica-alumina composition was coimpregnated with the above solution by the Pore Filling method, dried at 110° C. for 48 h, formed into a disk shape and calcined at 500° C. for 3 h in a flow of air, to prepare Catalyst $A_2$.

The silica-alumina compositions containing silica at 20 wt. % and 95 wt. % were prepared in the same manner as the above, except the ratio of aluminium triisopropoxide and tetraethoxysilane was changed. They were used to prepare Catalysts $A_1$ and $A_3$ containing silica at 20 wt. % and 95 wt. %, respectively, also in manner similar to the above. Each of the hydrotreating Catalysts $A_1$, $A_2$ and $A_3$ contained nickel oxide (NiO) and molybdenum oxide ($MoO_3$) at 3 wt. % and 12 wt. %, respectively.

Catalysts $A_0$

Catalyst $A_0$ was prepared in the same manner as the above, except that a mesoporous silica-alumina composition was used in place of the silica-alumina composition of Catalysts $A_3$ described above. The content of silica in the porous silica-alumina was 95 wt. %. This catalyst contained nickel oxide (NiO) and molybdenum oxide ($MoO_3$) at 3 wt. % and 12 wt. %, respectively.

The mesoporous silica-alumina composition was prepared by the following procedure. 170.11 g of water glass No. 3 (produced by Koso Kagaku Yakuhin), 6.7 g of sodium aluminate (NaAlO$_2$) (produced by Koso Kagaku Yakuhin), 75.5 g of n-hexadecyltrimethyl ammonium bromide [($C_{16}H_{33}$)N($CH_3$)$_3$Br] (produced by Tokyo Kasei Kogyo) were dissolved in 975.57 g of water. This solution was adjusted at pH=10 with 20.4 g of sulfuric acid ($H_2SO_4$). It was then treated under hydrothermal conditions, with stirring, at 120° C. for 82 h in an autoclave. The product was washed with water, dried at 110° C. for 16 h, and calcined at 600° C. for 5 h, to prepare the mesoporous silica-alumina composition. It showed a different crystal structure from that of the silica-alumina composition (e.g., with respect to specific surface area and average pore diameter).

Comparative Example X

Comparative Catalyst A

Comparative Catalyst A was prepared in the same manner as that for Catalyst $A_2$, except that alumina (produced by Nippon Ketjen) was used in place of the silica-alumina composition. This catalyst contained nickel oxide (NiO) and molybdenum oxide ($MoO_3$) at 3 wt. % and 12 wt. %, respectively.

Catalyst $A_1$, Catalyst $A_2$, Catalyst $A_3$, Catalyst $A_0$ and Comparative Catalyst A contained B acid at 50 μmol/g, 150

μmol/g, 85 μmol/g, 180 μmol/g and 0 μmol/g, respectively. B acid content was determined by the method described earlier. Evacuation of the tube was effected by a vacuum device produced by Shinku Kiko), and quantity of 2,6-DMPy was determined by conductometric titration. Properties of these catalysts are given in Table 2.

TABLE 2

| | EXAMPLE X | | | | |
|---|---|---|---|---|---|
| | Catalyst $A_1$ | Catalyst $A_2$ | Catalyst $A_3$ | Catalyst $A_0$ | Comparative Catalyst A |
| Carrier | | | | | |
| · Type of carrier | Silica-Alumina | Silica-Alumina | Silica-Alumina | Mesoporous Silica-Alumina | Alumina |
| · Specific surface area (m²/g) | 670 | 660 | 400 | 970 | 200 |
| · Silica content (wt. %) | 20 | 50 | 95 | 95 | 0 |
| · B acid content (μmol/g) | 50 | 150 | 85 | 180 | 0 |
| Quantities of supported active components | | | | | |
| NiO (wt. %) | 3 | 3 | 3 | 3 | 3 |
| MoO₃ (wt. %) | 12 | 12 | 12 | 12 | 12 |

B acid content: Brønsted acid content

Desulfurization Test Method

Each hydrotreating catalyst prepared was tested for its desulfurization activity using the sample oils shown in Table 1 by a flow type autoclave (inner diameter: 25.4 mm and length: 100 mm). Table 3 gives the desulfurization test conditions. Each catalyst was milled to have a diameter of 0.6 to 0.8 mm, and 0.5 g of the milled catalyst was charged into the autoclave. The sample oil was treated over the catalyst until sulfur content attained an equilibrium level, which took about 1 h, and desulfurization rate (%) as the catalyst activity was determined from the equilibrium sulfur content. The tolerance of the inhibiting effects by $H_2S$ with Sample Oil 2 is defined as the desulfurization activity with that Sample Oil 2 relative to the activity with Sample Oil 1 (n-$C_{16}$ incorporated only with 4,6-DMDBT) under the desulfurization test conditions shown in Table 3. Thus, the tolerance of the inhibiting effects by $H_2S$ was determined with Sample Oils 3 to 7. The desulfurization test was also conducted separately with n-$C_{16}$ incorporated only with DMDS, which confirmed that DMDS was thermally decomposed almost completely and sulfur contained therein was totally converted into $H_2S$.

TABLE 3

| Desulfurization Test Conditions | I | II |
|---|---|---|
| Sample oil flow rate (ml/min) | 0.15 | 0.05 |
| Reaction temperature (° C.) | 310 | 340 |
| Hydrogen partial pressure (MPa) | 0.9 | 0.9 |
| Hydrogen flow rate (NL/L) | 400 | 400 |

EXAMPLE X-1

Sample Oils 1 to 4, shown in Table 1, were desulfurization-tested in the presence of Catalyst $A_2$ under the desulfurization test conditions I shown in Table 3. The test results are given in FIG. 1, which shows the relationship between the desulfurization activity and content of DMDS-derived sulfur in the sample oil.

Comparative Example X-1

The desulfurization test was conducted under the same conditions as those for EXAMPLE X-1 except that Comparative Catalyst A was used in place of Catalyst $A_2$. The test results are also given in FIG. 1, which shows the relationship between the desulfurization activity and content of DMDS-derived sulfur in the sample oil.

EXAMPLE X-2

The desulfurization tests were conducted with Sample Oil 5 shown in Table 1, which was passed over Catalyst $A_1$, Catalyst $A_2$, Catalyst $A_3$, Catalyst $A_0$ and Comparative Catalyst A under the desulfurization test conditions II shown in Table 3. These catalyst samples had different B acid contents. The test results are given in FIG. 2, which shows the relationship between the tolerance to the inhibiting effects by $H_2S$ and B acid content.

EXAMPLE X-3

The desulfurization test was conducted with Sample Oil 5 shown in Table 1, which was passed over Catalyst $A_0$ under the desulfurization test conditions II shown in Table 3. The test results are given in Table 4. The test was also conducted over Catalyst $A_3$, which contained the same silica content (95 wt. %) and was on the silica-alumina (amorphous silica-alumina) carrier, under the same conditions. The test results are also given in Table 4, for comparison.

TABLE 4

| | Catalyst $A_0$ | Catalyst $A_3$ |
|---|---|---|
| Carriers | | |
| • Type | Mesoporous silica-alumina | Silica-alumina |
| • Specific surface area (m²/g) | 970 | 400 |
| • Silica content (wt. %) | 95 | 95 |
| • B acid content (μmol/g) | 180 | 85 |
| Contents of the supported active components | | |
| • NiO (wt. %) | 3 | 3 |
| • MoO₃ (wt. %) | 12 | 12 |

TABLE 4-continued

|  | Catalyst $A_0$ | Catalyst $A_3$ |
| --- | --- | --- |
| Catalyst performance evaluation results |  |  |
| • Desulfurization activity | 8.55 | 3.33 |
| • Tolerance to the inhibiting effects by $H_2S$ | 0.34 | 0.22 |

B acid content: Brønsted acid content
Tolerance to the inhibiting effects by $H_2S$: Relative desulfurization activity (a)/(b) in percentage, where (a) is the activity with Sample Oil 5 tested under the conditions II and (b) is the activity with Sample Oil 1 tested under the conditions I.

Figure 2:
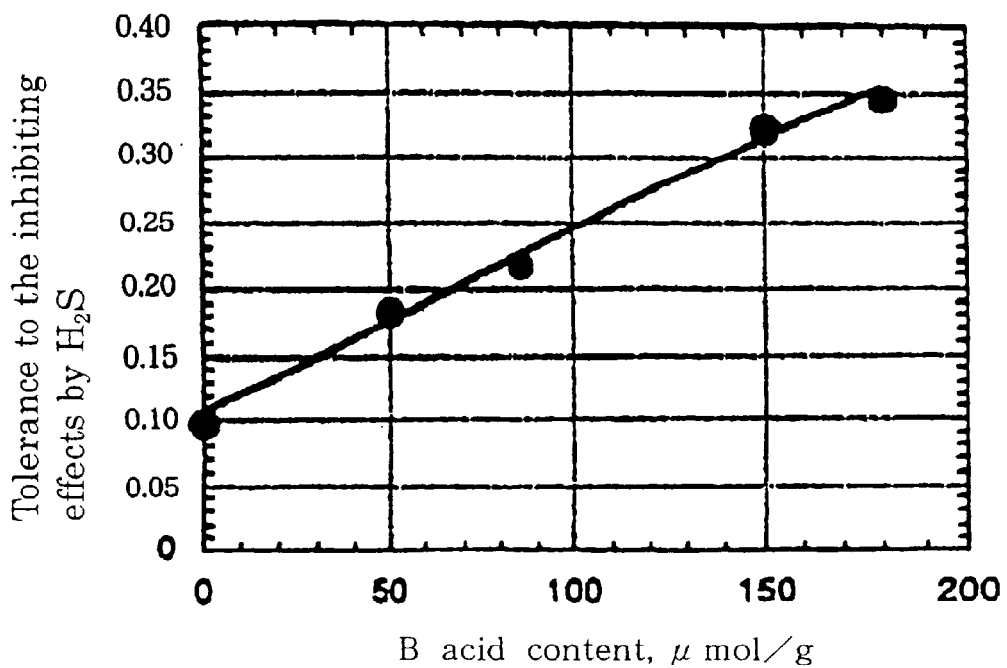
FIG. 2 illustrates the relationship between tolerance to the inhibiting effects by hydrogen sulfide and Brønsted acid (hereinafter referred to as the "B acid".) content of the carrier, for the catalysts $A_1$, $A_2$, $A_3$ and $A_0$ (EXAMPLE X) and comparative catalyst A (COMPARATIVE EXAMPLE X) of different B acid contents.

As shown in FIG. 1, Catalyst $A_2$ has a much higher activity than Comparative Catalyst A, even with the DMDS-added sample oil, i.e., the sample oil which produces a larger quantity of hydrogen sulfide, by which is meant that Catalyst $A_2$ has notably improved tolerance to the inhibiting effects by $H_2S$. It is considered that the improved tolerance mainly results from the interactions of the spill-over hydrogen forming sites (Ni) with the silica-alumina carrier. FIG. 2 shows that the tolerance to the inhibiting effects by $H_2S$ increases linearly with B acid content of the catalyst. As shown in Table 4, it is also noted that Catalyst $A_0$ on the mesoporous silica-alumina carrier has a much higher desulfurization activity and tolerance to the inhibiting effects by $H_2S$ than Catalyst $A_3$ on the amorphous silica-alumina carrier of the same silica content, conceivably resulting from the mesoporous silica-alumina carrier's larger specific surface area which increases B acid content and allows the active components to be dispersed more finely.

EXAMPLE Y

Catalysts $A_4$ 96.51 g of aluminium tri-sec-butoxide [Al(sec-OC$_4$H$_9$)$_3$] was mixed and reacted with 800 ml of 2-methylpentane-2,4-diol [CH$_3$CH(OH)CH$_2$C(CH$_3$)$_2$OH], with stirring, at 80° C. for 5 h, to which 69.3 g of tetraethoxysilane [Si(OC$_2$H$_5$)$_4$] was added to be further reacted with the above at 80° C. for 12 h, with stirring, to form a homogeneous solution. Then, 225.8 ml of water was dropped to the above solution at 1 ml/min, for hydrolysis at 80° C. On completing the hydrolysis, the product gel was dried at 90° C. and calcined at 600° C. for 5 h in a flow of air, to prepare the silica-alumina composition. It contained silica at 50 wt. %.

Next, 7.79 g of nickel nitrate [Ni(NO$_3$)$_2$.6H$_2$O], 9.81 g of ammonium molybdate [(NH$_4$)$_6$Mo$_7$O$_{24}$.4H$_2$O], and 4.33 g of citric acid were dissolved in 56.2 g of a mixed solution of concentrated ammonia water and pure water, to prepare the solution for impregnation. Composition of the mixed solution of ammonia water and water was set to adjust the solution for impregnation at pH=9, after it dissolved all of the above solutes. The above silica-alumina composition was coimpregnated with the above solution for impregnation by the Pore Filling method, dried at 110° C. for 48 h, formed into a disk shape and calcined at 500° C. for 3 h in a flow of air, to prepare Catalyst $A_4$.

Silica dispersibility of the carrier for Catalyst $A_4$ was determined by the $^{29}$Si-NMR method under the following conditions. The results are:

| ① NMR peak area ratio I | 46.2% |
| --- | --- |
| ② NMR peak area ratio II | 80.2% |

The carrier contained B acid at 105 μmol/g.

The spectral peaks of the carrier obtained by the $^{29}$Si-NMR (79.5 MHz) method were processed for waveform deconvolution by the least square adjustment method using the Gaussian function curve into those at −80 ppm, −86 ppm, −92 ppm, −98 ppm, −104 ppm and −110 ppm. The above results of the NMR analysis were obtained by calculating a peak area ratio, where ① NMR peak area ratio I is the combined area of the peaks at −80 ppm, −86 ppm and −92 ppm relative to the total area of all peaks, and ② NMR peak area ratio II is the combined area of the peaks at −80 ppm, −86 ppm, −92 ppm and −98 ppm relative to the total area of all peaks.

Catalysts $A_5$

The silica-alumina carrier for Catalyst $A_5$ was prepared in the same manner as that for the carrier for Catalyst $A_4$, except that aluminium triisopropoxide [Al(i-OC$_3$H$_7$)$_3$] was used as the aluminium alkoxide and a silica content of the carrier was adjusted at 40 wt. %. It was then incorporated with the nickel and molybdenum components, to produce Catalyst $A_5$. The carrier had NMR peak area ratio I of 71.3% and NMR peak area ratio II of 93.2%, and contained B acid at 100 μmol/g.

Catalysts $A_6$

The silica-alumina carrier for Catalyst $A_6$ was prepared in the same manner as that for the carrier for Catalyst $A_4$, except that the composition of aluminium triisopropoxide and tetraethoxysilane was adjusted so as to have a silica content in the silica-alumina of 60 wt. %. It was then incorporated with the nickel and molybdenum components, to produce Catalyst $A_6$. The carrier had NMR peak area ratio I of 34.4% and NMR peak area ratio II of 72%, and contained B acid at 138 μmol/g.

Catalysts $A_7$

The silica-alumina carrier for Catalyst $A_7$ was prepared in the same manner as that for the carrier for Catalyst $A_4$, except that the composition of aluminium triisopropoxide and tetraethoxysilane was adjusted to have a silica content in the silica-alumina of 75 wt. %. It was then incorporated with the nickel and molybdenum components, to produce Catalyst $A_7$. The results are given in Table 6.

Catalysts $A_8$

The silica-alumina carrier for Catalyst $A_8$ was prepared in the same manner as that for the carrier for Catalyst $A_4$, to have a silica content of 50 wt. %. It was then incorporated first with the nickel component by the procedure in which the carrier was immersed in 0.5N ammonia water for 2 to 10 days, filtered, washed, dried at room temperature for 24 h, and then the carrier was immersed in a 0.5N aqueous solution of nickel nitrate for 2 to 10 days, filtered, washed, dried at 110° C. for 24 h, and calcined at 500° C. for 3 h in a flow of air. It was then impregnated with the molybdenum component by the Pore Filling method, dried, formed into a shape and calcined, to prepare Catalyst $A_8$.

Comparative Example Y

Comparative Catalyst B

The silica-alumina carrier for Comparative Catalyst B was prepared using commercial silica-alumina to have a silica content of 56 wt. %. It was incorporated with the nickel and molybdenum components in the same manner as that for Catalyst $A_4$. The carrier had NMR peak area ratio I of 12.8% and NMR peak area ratio II of 32.8%, and contained B acid at 32 μmol/g.

Comparative Catalyst C

A commercial silica-alumina carrier containing silica at 60 wt. %. was incorporated with the nickel and molybdenum components in the same manner as that for Catalyst $A_4$, to prepare Comparative Catalyst C. The carrier had NMR peak area ratio I of 12% and NMR peak area ratio II of 55%, and contained B acid at 48 μmol/g.

Comparative Catalyst D

A commercial silica-alumina carrier containing silica at 40 wt. % was incorporated with the nickel and molybdenum components in the same manner as that for Catalyst $A_4$, to prepare Comparative Catalyst D. The carrier had NMR peak area ratio I of 18% and NMR peak area ratio II of 30%, and contained B acid at 30 μmol/g.

Properties of Catalysts $A_4$ to $A_8$ and Comparative Catalysts B to D are given in Table 6.

EXAMPLE Y-1

Sample Oil 4 shown in Table 1 was hydrotreated over Catalysts $A_4$ to $A_8$ under the hydrotreatment conditions A shown in Table 5, to evaluate their catalyst performance with respect to desulfurization activity (HDS 1) and tolerance to the inhibiting effects by $H_2S$, defined below. The results are given in Table 6.

Comparative Example Y-1

Sample Oil 4 shown in Table 1 was hydrotreated over Comparative Catalysts B to D under the hydrotreatment conditions A shown in Table 5, to evaluate their catalyst performance with respect to desulfurization activity (HDS 1) and tolerance to the inhibiting effects by $H_2S$. The results are given in Table 6.

EXAMPLE Y-2

Sample Oil 6 shown in Table 1 was hydrotreated over Catalysts $A_4$ to $A_8$ under the hydrotreatment conditions B shown in Table 5, to evaluate their relative desulfurization activity (HDS 2), relative denitrogenation activity (HDN) and relative dearomatization activity (HDA), defined below. The results are given in Table 6.

Comparative Example Y-2

Sample Oil 6 shown in Table 1 was hydrotreated over Comparative Catalysts B to D under the hydrotreatment conditions B shown in Table 5, to evaluate their relative desulfurization activity (HDS 2), relative denitrogenation activity (HDN) and relative dearomatization activity (HDA), defined below. The results are given in Table 6.

TABLE 5

| Hydrotreatment Conditions | A | B |
|---|---|---|
| Reaction temperature (° C.) | 310 | 320 |
| Reaction pressure (kg/cm²G) | 10 | 10 |
| Hydrogen gas/sample oil ratio (SCF/B) | 2000 | 800 |
| Liquid hourly space velocity LHSV (h⁻¹) | 1.0 | 1.0 |

Catalyst Performance Evaluation

HDS 1: Desulfurization activity with Sample Oil 4 for 4,6-DMDBT, treated under the hydrotreatment conditions A Tolerance to the Inhibiting Effects by $H_2S$ Relative desulfurization activity (a)/(b), where (a) is the desulfurization activity with Sample Oil 4 for 4,6-DMDBT hydrotreated under the conditions A and (b) is the desulfurization activity with Sample Oil 1 for 4,6-DMDBT hydrotreated under the conditions A.

HDS 2: Desulfurization activity with Sample Oil 6, treated under the hydrotreatment conditions B, relative to that of Comparative Catalyst C.

HDN: Denitrogenation activity with Sample Oil 6, treated under the hydrotreatment conditions B, relative to that of Comparative Catalyst C.

HDA: Dearomatization activity with Sample Oil 6, treated under the hydrotreatment conditions B, relative to that of Comparative Catalyst C.

$^{29}$Si-Nuclear Magnetic Resonance Analysis

Analysis Conditions

| | |
|---|---|
| Nuclear magnetic resonance analyzer | BRUKER's DSX-400 |
| Analyzed nuclear | $^{29}$Si (79.5 MHz) |
| Analysis mode | High-power decoupling/Magic angle spinning |
| Excited pulse flip angle | 30 to 45° |
| Latency time | 40s or longer |
| Sample rotational speed | 7 KHz |
| Window processing | Exponential function (coefficient: 50 Hz) |
| Sample pretreatment | No pretreatment |
| Peak area | Area of the peak waveform-deconvoluted from the observed spectral patterns |
| Standard sample | The peak of 3-(trimethylsilyl) propane sodium sulfonate [$(CH_3)_3SiC_3H_6SO_3Na$] is regarded to be positioned at 1.46 ppm |

Waveform Deconvolution

The observed spectral patterns are deconvoluted by the least square adjustment method using the Gaussian function curve into 6 peaks. Full width at half maximum of these deconvoluted peaks are given below. The full width at half maximum of the peaks at −80.00 ppm and −110.00 ppm are those which make the synthesized spectral patterns from the 6 peaks closest to the observed spectral patterns. The silica dispersibity is set as follows.

| Silica bonds | Peak positions (ppm) | Full width half max (ppm) |
|---|---|---|
| Si-4(OAl) | −80.00 | Calculated |
| Si-3(OAl) | −86.00 | 9.00 |
| Si-2(OAl) | −92.00 | 8.00 |
| Si-1(OAl) | −98.00 | 9.00 |
| Si—O—Si | −104.00 | 9.00 |
| Si—O—Si | −110.00 | Calculated |

TABLE 6

|  | EXAMPLES Y | | | | | COMPARATIVE EXAMPLES Y | | |
| --- | --- | --- | --- | --- | --- | --- | --- | --- |
|  | Catalyst $A_4$, | Catalyst $A_5$, | Catalyst $A_6$, | Catalyst $A_7$, | Catalyst $A_8$, | Comparative Catalyst B | Comparative Catalyst C | Comparative Catalyst D |
| Carriers | | | | | | | | |
| $SiO_2$ content (wt. %) | 50 | 40 | 60 | 75 | 50 | 56 | 60 | 40 |
| B acid content (μmol/g) | 105 | 100 | 138 | 100 | 105 | 32 | 48 | 30 |
| $^{29}$Si-NMR analysis results | | | | | | | | |
| NMR peak area ratio I | 46.2 | 71.3 | 34.4 | 16.7 | 46.2 | 12.8 | 12.0 | 18.0 |
| NMR peak area ratio II | 80.2 | 93.2 | 72.0 | 55.3 | 80.2 | 32.8 | 55.0 | 30.0 |
| Active components | | | | | | | | |
| NiO (wt. %) | 4 | 4 | 4 | 4 | 4 | 4 | 4 | 4 |
| $MoO_a$ (wt. %) | 16 | 16 | 16 | 16 | 16 | 16 | 16 | 16 |
| CoO (wt. %) | — | — | — | — | — | — | — | — |
| Catalyst performance evaluation results | | | | | | | | |
| HDS 1 | 16 | 11 | 21 | 16 | 15 | 1 | 4 | 2.9 |
| Tolerance to the inhibiting effects by $H_2S$ | 0.66 | 0.52 | 0.70 | 0.64 | 0.80 | 0.10 | 0.35 | 0.25 |
| HDS 2 | 178 | 145 | 200 | 155 | 178 | 33 | 100 | 78 |
| HDN | 158 | 126 | 133 | 122 | 160 | 83 | 100 | 100 |
| HDA | 217 | 182 | 262 | 178 | 183 | 89 | 100 | 95 |

NMR peak area ratio I: Combined area of the peaks at −80 ppm, −86 ppm and −92 ppm relative to the total area of all peaks.
NMR peak area ratio II: Combined area of the peaks at −80 ppm, −86 ppm, −92 ppm and −98 ppm relative to the total area of all peaks.

The results of EXAMPLES and COMPARATIVE EXAMPLES show that the catalyst with the active components of a Group 8 element and Group 6 element has high tolerance to the inhibiting effects by $H_2S$ and a high activity, when these active components are supported by the silica-alumina carrier containing silica at 2 wt. % or more, particularly 30 wt. % or more, and specified NMR peak ratios I and II to have a sufficient content of B acid.

EXAMPLES W

Catalysts $A_9$

The silica-alumina carrier for Catalyst $A_9$ was prepared in the same manner as that for Catalyst $A_4$, except that the silica-alumina composition containing 50 wt. % of silica was impregnated with an aqueous solution of magnesium nitrate by the Pore Filling method, where concentration of the magnesium nitrate solution was adjusted so as to have 1 wt. % of MgO in the carrier. It was dried at 110° C. for 48 h, formed into a disk shape, and calcined at 500° C. for 3 h in a flow of air, to prepare the silica-alumina-magnesia ($SiO_2$—$Al_2O_3$—MgO) carrier.

Next, 10.38 g of nickel nitrate [$Ni(NO_3)_2 \cdot 6H_2O$], 13.08 g of ammonium molybdate [$(NH_4)_6Mo_7O_{24} \cdot 4H_2O$], and 5.77 g of citric acid were dissolved in 54.9 g of a mixed solution of concentrated ammonia water and pure water, to prepare the solution for impregnation. Composition of the mixed solution of ammonia water and water was set to adjust the solution for impregnation at pH=9, after it dissolved all of the above solutes. The above silica-alumina-magnesia carrier was coimpregnated with the above solution by the Pore Filling method, dried at 110° C. for 48 h, formed into a disk shape and calcined at 500° C. for 3 h in a flow of air, to prepare Catalyst $A_9$. Its composition is given in Table 7.

Catalysts $A_{10}$

The silica-alumina carrier for Catalyst $A_{10}$ was prepared in the same manner as that for the carrier for Catalyst $A_9$, except that an aqueous solution of sodium hydroxide was used in place of the magnesium nitrate solution, to have the silica-alumina-sodium oxide ($SiO_2$—$Al_2O_3$—$Na_2O$) carrier containing 1 wt. % of sodium oxide. Then, the same procedure as used for Catalyst $A_9$ was repeated to prepare Catalyst $A_{10}$.

The carriers for Catalysts $A_9$, $A_{10}$ and $A_{11}$ were measured for their 2,6-DMPy-TPD profiles at 200° C. to 400° C., 400° C. to 600° C. and 600° C. to 800° C. The results are given in Table 7.

Catalysts $A_{11}$ 80.13 g of aluminium triisopropoxide [$Al(i-OC_3H_7)_9$] was mixed and reacted with 788 ml of 2-methylpentane-2,4-diol [$CH_3CH(OH)CH_2C(CH_3)_2OH$], with stirring, at 80° C. for 5 h, to which 69.3 g of tetraethoxysilane [$Si(OC_2H_5)_4$] was added to be further reacted with the above at 80° C. for 12 h, with stirring. Then, 225.8 ml of water was dropped to the above effluent at 1 ml/min, for hydrolysis at 80° C. On completing the hydrolysis, the product was dried at 90° C., and calcined at 600° C. for 5 h in a flow of air, to prepare the silica-alumina composition containing silica at 50 wt. %.

Next, 10.38 g of nickel nitrate [$Ni(NO_3)_2 \cdot 6H_2O$], 13.08 g of ammonium molybdate [$(NH_4)_6Mo_7O_{24} \cdot 4H_2O$], and 5.77 g of citric acid were dissolved in 54.89 g of a mixed solution of concentrated ammonia water and pure water, to prepare the solution for impregnation. Composition of the mixed solution of ammonia water and water was set to adjust the solution for impregnation at pH=9, after it dissolved all of the above solutes. The above silica-alumina composition was coimpregnated with the above solution by the Pore Filling method, dried at 110° C. for 48 h, formed into a disk shape, milled into particles of 600 μm to 800 μm in diameter, and calcined at 500° C. for 3 h in a flow of air, to prepare Catalyst $A_{11}$, which contained $MoO_3$ and NiO at 20 wt. % and 5 wt. %, respectively, based on the total weight of the catalyst.

EXAMPLE W-1

Sample Oil 6 shown in Table 1 was hydrotreated over Catalysts $A_9$, $A_{10}$ and $A_{11}$ under the hydrotreatment conditions B shown in Table 5, to evaluate their desulfurization activity maintenances by measuring their initial desufurization activities, and desulfurization activities at 30 h and 100 h. The results are given in Table 7.

TABLE 7

| | EXAMPLES W | | |
|---|---|---|---|
| | Catalyst $A_9$ | Catalyst $A_{10}$ | Catalyst $A_{11}$ |
| Carriers | | | |
| $SiO_2$ (wt. %) | 49.5 | 49.5 | 50.0 |
| $Al_2O_3$ (wt. %) | 49.5 | 49.5 | 50.0 |
| MgO (wt. %) | 1.0 | — | — |
| $Na_2O$ (wt. %) | — | 1.0 | — |
| Active components | | | |
| NiO (wt. %) | 5 | 5 | 5 |
| $MoO_3$ (wt. %) | 20 | 20 | 20 |
| B acid contents | | | |
| Total B acid content ($\mu$mol/g) | 92 | 95 | 105 |
| B acid content ($\mu$mol/g: 200–400° C.) | 57 | 57 | 56 |
| B acid content ($\mu$mol/g: 400–600° C.) | 30 | 32 | 34 |
| B acid content ($\mu$mol/g: 600–800° C.) | 5 | 6 | 15 |
| Performance evaluation results[Note 1] | | | |
| HDS (initial) | 150 | 150 | 170 |
| HDS (30h) | 130 | 125 | 140 |
| HDS (100h) | 120 | 115 | 100 |
| Rate of activity maintenance (%)[Note 2] | 80 | 77 | 59 |

[Note 1] Performance evaluation results
Relative desulfurization activity (HDS): Initial desulfurization activities and desulfurization activities at 30h and 100h with Catalysts $A_9$ and $A_{10}$ and initial desulfurization activities and desulfurization activities at 30h with Catalysts $A_{11}$ relative to desulfurization activities at 100h with Catalysts $A_{11}$
[Note 2] Rate of activity maintenance (%): [HDS(100h)/HDS(initial)] × 100

In comparison with the above Examples and the Comparative Examples, Catalyst $A_9$ and $A_{10}$, which contained the respective alkali metal and alkaline earth metal components, and B acid at 50 mmol/g or more, had almost the same B acid contents in the 2,6-DMPy-TPD profiles at 200° C. to 400° C. and 400° C. to 600° C. as Catalyst $A_{11}$ containing no alkali metal, but much lower B acid content at 600° C. to 800° C. than Catalyst $A_{11}$, which was accompanied by improved activity maintenance.

EXAMPLES

Catalysts $A_{12}$ 80.13 g of aluminium triisopropoxide [Al(i-OC$_3$H$_7$)$_3$] was mixed and reacted with 788 ml of 2-methylpentane-2,4-diol [CH$_3$CH(OH)CH$_2$C(CH$_3$)$_2$OH], with stirring, at 80° C. for 5 h, to which 69.3 g of tetraethoxysilane [Si(OC$_2$H$_5$)$_4$] was added to be further reacted with the above at 80° C. for 12 h, with stirring. Then, 225.8 ml of water was dropped to the above effluent at 1 ml/min, for hydrolysis at 80° C. On completing the hydrolysis, the product was dried at 90° C., and calcined at 600° C. for 5 h in a flow of air, to prepare the silica-alumina composition containing silica at 50 wt. %.

The silica-alumina composition was impregnated with an aqueous solution of boric acid by the Pore Filling method, where concentration of the boric acid solution was adjusted to have 5 wt. % of boria ($B_2O_3$) in the carrier. It was dried at 110° C. for 48 h, and calcined at 500° C. for 3 h in a flow of air, to prepare the silica-alumina-boria ($SiO_2$—$Al_2O_3$—$B_2O_3$) carrier. Its total B acid content was 135 $\mu$mol/g.

Next, 13.77 g of ammonium molybdate [(NH$_4$)$_6$Mo$_7$O$_{24}$·4H$_2$O], 10.92 g of nickel nitrate [Ni(NO$_3$)$_2$·6H$_2$O], and 6.07 g of citric acid were dissolved in 57.8 g of a mixed solution of concentrated ammonia water and pure water, to prepare the solution for impregnation. Composition of the mixed solution of ammonia water and water was set to adjust the solution for impregnation at pH=9, after it dissolved all of the above solutes. The above silica-alumina composition was coimpregnated with the above solution by the Pore Filling method, dried at 110° C. for 48 h, formed into a disk shape, milled into particles of 600 $\mu$m to 800 $\mu$m in diameter, and calcined at 500° C. for 3 h in a flow of air, to prepare Catalyst $A_{12}$, which contained $MoO_3$ and NiO at 20 wt. % and 5 wt. %, respectively, based on the weight of the catalyst. Its properties are given in Table 8.

Catalysts $A_{13}$

The silica-alumina carrier for Catalyst $A_{13}$ was prepared in the same manner as that for the carrier for Catalyst $A_{12}$, except that titania ($TiO_2$) was used in place of boria ($B_2O_3$), to have the silica-alumina-titania ($SiO_2$—$Al_2O_3$—$TiO_2$) carrier. Then, the carrier was incorporated with the $MoO_3$ and NiO as the active components to prepare Catalyst $A_{13}$. Its properties are given in Table 8.

Catalysts $A_{14}$

The silica-alumina carrier for Catalyst $A_{14}$ was prepared in the same manner as that for the carrier for Catalyst $A_{12}$, except that zirconia ($ZrO_2$) was used in place of boria ($B_2O_3$), to have the silica-alumina-zirconia ($SiO_2$—$Al_2O_3$—$ZrO_2$) carrier. Then, the carrier was incorporated with the $MoO_3$ and NiO as the active components to prepare Catalyst $A_{14}$. Its properties are given in Table 8.

Catalysts $A_{15}$

The silica-alumina carrier for Catalyst $A_{15}$ was prepared in the same manner as that for the carrier for Catalyst $A_{12}$, except that thoria ($ThO_2$) was used in place of boria ($B_2O_3$), to have the silica-alumina-thoria ($SiO_2$—$Al_2O_3$—$ThO_2$) carrier. Then, the carrier was incorporated with the $MoO_3$ and NiO as the active components to prepare Catalyst $A_{15}$. Its properties are given in Table 8.

EXAMPLES S-1

Sample Oil 4 shown in Table 1 was hydrotreated over Catalysts $A_{12}$ to $A_{15}$ and Catalyst $A_{11}$ under the hydrotreatment conditions A shown in Table 5, to evaluate their catalyst performance with respect to desulfurization activity (HDS 1) and tolerance to the inhibiting effects by $H_2S$. The results are given in Table 8.

EXAMPLES S-2

Sample Oil 6 shown in Table 1 was hydrotreated over Catalysts $A_{12}$ to $A_{15}$ and Catalyst $A_{11}$ under the hydrotreatment conditions B shown in Table 5, to evaluate their catalyst performance with respect to relative desulfurization activity (HDS 2), relative denitrogenation activity (HDN) and relative dearomatization activity (HDA).

HDS 2, HDN and HDA are the activities relative to those with Catalyst $A_{11}$.

TABLE 8

EXAMPLES S

|  | Catalyst $A_{12}$ | Catalyst $A_{13}$ | Catalyst $A_{14}$ | Catalyst $A_{15}$ | Catalyst $A_{11}$ |
|---|---|---|---|---|---|
| Carriers | 5% $B_2O_3$ 47.5% $SiO_2$ 47.5% $Al_2O_3$ | 5% $TiO_2$ 47.5% $SiO_2$ 47.5% $Al_2O_3$ | 5% $ZrO_2$ 47.5% $SiO_2$ 47.5% $Al_2O_3$ | 5% $ThO_2$ 47.5% $SiO_2$ 47.5% $Al_2O_3$ | 50% $SiO_2$ 50% $Al_2O_3$ |
| Contents of active components | | | 20% $MoO_3$—5% NiO | | |
| Total B acid content($\mu$mol/g) | 135 | 125 | 120 | 112 | 105 |
| B acid content($\mu$mol/g: 200–400° C.) | 73 | 68 | 65 | 58 | 56 |
| B acid content($\mu$mol/g: 400–600° C.) | 45 | 42 | 40 | 40 | 34 |
| B acid content($\mu$mol/g: 600–800° C.) | 17 | 15 | 15 | 14 | 15 |
| Performance evaluation results | | | | | |
| HDS 1 | 22 | 21 | 20 | 19 | 16 |
| Tolerance to the inhibiting effects by $H_2S$ | 0.75 | 0.70 | 0.71 | 0.68 | 0.66 |
| HDS 2 | 130 | 125 | 110 | 105 | 100 |
| HDN | 120 | 105 | 105 | 103 | 100 |
| HDA | 125 | 107 | 110 | 105 | 100 |

Notes)
HDS 1: Desulfurization activity with Sample Oil 4 under the hydrotreatment conditions A
HDS 2: Relative desulfurization activity, i.e. desulfurization activity with Sample Oil 6 over a catalyst under the hydrotreatment conditions B, relative to that over Catalyst $A_{11}$.
Tolerance to the inhibiting effects by $H_2S$:
(Desulfurization activity with Sample Oil 4 under the hydrotreatment conditions A)/
(Desulfurization activity with Sample Oil 1 under the hydrotreatment conditions A)
HDN: Relative denitrogenation activity, i.e., denitrogenation activity with Sample Oil 6 over a catalyst under the hydrotreatment conditions B, relative to that over Catalyst $A_{11}$.
HDA: Relative dearomatization activity, i.e., dearomatization activity with Sample Oil 6 over a catalyst under the hydrotreatment conditions B, relative to that over Catalyst $A_{11}$.

EXAMPLES above show that the catalysts with the metallic component of boria or the like as the third component contained a B acid content of 50 $\mu$mol/g or more with notably increased medium weak B acid contents, and exhibited improved tolerance to the inhibiting effects by $H_2S$, a high desulfurization activity for difficult-to-remove sulfur compounds, and also high denitrogenation and dearomatization activities.

EXAMPLE Z

Catalyst $A_{16}$

The silica-alumina carrier for Catalyst $A_{16}$ was prepared in the same manner as that for Catalyst $A_{12}$, to contain 50 wt. % of silica. Next, 12.07 g of phosphomolybdenic acid ($H_3(PMo_{12}O_{40}).6H_2O$), 10.50 g of nickel nitrate [$Ni(NO_3)_2.6H_2O$], 5.83 g of citric acid were dissolved in 61.6 g of a mixed solution of concentrated ammonia water and pure water, to prepare the solution for impregnation. Composition of the mixed solution of ammonia water and water was set to adjust the solution for impregnation at pH=9, after it dissolved all of the above solutes. The above silica-alumina carrier was coimpregnated with the above solution by the Pore Filling method, dried at 110° C. for 48 h, formed into a disk shape and calcined at 500° C. for 3 h in a flow of air, to prepare Catalyst $A_{16}$. Its composition is given in Table 9.

EXAMPLE Z-1

Sample Oils 7 and 6 shown in Table 1 were hydrotreated over Catalysts $A_{16}$, obtained by EXAMPLE Z, and Catalyst $A_{11}$ under each set of the hydrotreatment conditions shown in Table 5, to evaluate their desulfurization activities (HDS 1 and HDS 2, described below). The results are given in Table 9.

HDS 1: Desulfurization activity with Sample Oil 7 for 4,6-DMDBT under the hydrotreatment conditions A
HDS 2: Relative desulfurization activity, i.e. desulfurization activity with Sample Oil 6 over a catalyst under the hydrotreatment conditions B, relative to that over Catalyst $A_{11}$.

TABLE 9

|  | Catalyst $A_{16}$ | Catalyst $A_{11}$ |
|---|---|---|
| Carrier* | | |
| $SiO_2$ (wt. %) | 50 | 50 |
| $Al_2O_3$ (wt. %) | 50 | 50 |
| B acid content ($\mu$mol/g) | 105 | 105 |
| Contents of active components** | | |
| NiO (wt. %) | 5 | 5 |
| $MoO_3$ (wt. %) | 20 | 20 |
| Content of phosphorus component** | | |
| $P_2O_5$ (wt. %) | 0.82 | — |
| Performance evaluation results | | |
| HDS 1 | 8.3 | 4.8 |
| HDS 2 | 130 | 100 |

*$SiO_2$ and $Al_2O_3$ contents in the carrier are those based on the whole carrier, by weight
**Contents of the active metallic and phosphorus components are those based on the whole catalyst, by weight EXAMPLES show that addition of the phosphorus component improves tolerance of the catalyst to the inhibiting effects by nitrogen compounds, thereby greatly enhancing desulfurization activity for difficult-to-remove sulfur compounds.

Field of Industrial Utilization

The present invention relates to a high-activity hydrotreating catalyst, comprising a carrier containing a specific content of B acid and showing high tolerance to the inhibiting effects by hydrogen sulfide, and a method for hydrotreating hydrocarbon oils using the same, exhibiting notable effects in hydrotreating hydrocarbon oils containing difficult-to-remove sulfur compounds, in particular gas oil fractions. Use of the hydrotreating catalyst of the present invention allows deep desulfurization of sulfur-containing hydrocarbon oils, and greatly contributes to environmental preservation.

What is claimed is:

1. A hydrotreating catalyst characterized in that it comprises a carrier having a Brønsted acid content of 50 µmol/g or more, which supports at least one active component (A) selected from the elements of Group 8 of the Periodic Table, and at least one active component (B) selected from the elements of Group 6 of the Periodic Table.

2. The hydrotreating catalyst according to claim 1, wherein said carrier comprises at least one material selected from the group consisting of silica, alumina, boria, titania, zirconia, hafnia, ceria, thoria, magnesia, calcium oxide, zinc oxide, iron(III)oxide, beryllium oxide, chromium(III)oxide, phosphorus oxides, zeolites and clay minerals.

3. The hydrotreating catalyst according to claim 1, wherein said carrier is a silica-alumina carrier or a silica-alumina-third component carrier.

4. The hydrotreating catalyst according to claim 3, where said third component comprises at least one material selected from the group consisting of alkali metal components, alkaline earth metal components, boria, titania, zirconia, hafnia, ceria, thoria, zinc oxide, iron(III)oxide, beryllium oxide, chromium (III) oxide, phosphorus oxides, zeolites and clay minerals.

5. The hydrotreating catalyst according to claim 3, wherein said silica-alumina carrier or silica-alumina-third component carrier has a silica content of at least 2 wt. % based on the total weight of the carrier.

6. The hydrotreating catalyst according to claim 3, wherein the content of the third component of said silica-alumina-third component carrier is 0.01 wt. % to 50 wt. % as the oxide, based on the total weight of the carrier.

7. The hydrotreating catalyst according to claim 1, wherein the Brønsted acid content of said carrier is 80 µmol/g or more.

8. The hydrotreating catalyst according to claim 1, wherein said active component (A) comprises at least one element selected from the group consisting of cobalt, nickel, ruthenium, rhodium, palladium, iridium, and platinum, and said active component (B) is molybdenum and/or tungsten.

9. The hydrotreating catalyst according to claim 1, wherein said Brønsted acid content is 80 µmol/g or more, said active component (A) comprises at least one element selected from the group consisting of cobalt, nickel, ruthenium, rhodium, palladium, iridium, and platinum, and said active component (B) is molybdenum and/or tungsten.

10. A hydrotreating catalyst comprising a silica-alumina carrier or a silica-alumina-third component carrier which supports at least one active component (A) selected from the elements of Group 8 of the Periodic Table and at least one active component (B) selected from the elements of Group 6 of the Periodic Table; characterized in that, wherein:

(i) the silica content is at least 30 wt. % based on the total weight of the carrier;

(ii) the spectral patterns of the carrier observed by the nuclear magnetic resonance analysis [$^{29}$Si-NMR (79.5 MHz)] are specified by;

(1) the combined area of peaks at −80 ppm, −86 ppm and −92 ppm being at least 15% of the total area of all peaks, and (b) the combined area of peaks at −80 ppm, −86 ppm, −92 ppm and −98 ppm being at least 50% of the total area of all peaks, and (iii) Brønsted acid content of the carrier is 50 µmol/g or more.

11. The hydrotreating catalyst according to claim 10, wherein the silica content of said silica-alumina carrier or said silica-alumina-third component carrier is at least 40 wt. % based on the total weight of the carrier.

12. The hydrotreating catalyst according to claim 10, wherein said active component (A) comprises at least one element selected from the group consisting of cobalt, nickel, ruthenium, rhodium, palladium, iridium, and platinum, and said active component (B) is molybdenum and/or tungsten.

13. The hydrotreating catalyst according to claim 10, where said third component comprises at least one material selected from the group consisting of alkali metal components, alkaline earth metal components, boria, titania, zirconia, hafnia, ceria, thoria, zinc oxide, iron(III)oxide, beryllium oxide, chromium(III)oxide, phosphorus oxides, zeolites and clay minerals.

14. The hydrotreating catalyst according to claim 10, wherein the content of the third component of said silica-alumina-third component carrier is 0.01 wt. % to 50 wt. % as the oxide, based on the total weight of the carrier.

15. A catalyst composition comprising a mixture of hydrotreating catalysts, wherein one of said hydrotreating catalysts is the hydrotreating catalyst according to claim 1 and is present in an amount of from about 5 wt. % to 50 wt. % based on the total weight of the catalyst composition.

16. A method for hydrotreating a hydrocarbon oil characterized in that it comprises contacting a hydrocarbon oil with hydrogen under hydrotreating conditions in the presence of a hydrotreating catalyst according to claim 1.

17. The method for hydrotreating a hydrocarbon oil according to claim 16, wherein said hydrocarbon oil is a sulfur-containing gas oil fraction.

18. A catalyst composition comprising a mixture of hydrotreating catalysts, wherein one of said hydrotreating catalysts is the hydrotreating catalyst according to claim 10 and is present in an amount of from about 5 wt. % to 50 wt. % based on the total weight of the catalyst composition.

19. A method of hydrotreating a hydrocarbon oil characterized in that it comprises contacting a hydrocarbon oil with hydrogen under hydrotreating conditions in the presence of a hydrotreating catalyst according to claim 10.

20. The method for hydrotreating a hydrocarbon oil according to claim 19, wherein said hydrocarbon oil is a sulfur-containing gas oil fraction.

21. The hydrotreating catalyst according to claim 10, wherein Brønsted acid content of the carrier is 80 µmol/g or more.

22. The hydrotreating catalyst according to claim 12, wherein Brønsted acid content of the carrier is 80 µmol/g or more.

* * * * *